(12) United States Patent
Shimamura et al.

(10) Patent No.: US 11,874,012 B2
(45) Date of Patent: Jan. 16, 2024

(54) SERVER DEVICE, ADAPTER, AND AIR CONDITIONING SYSTEM

(71) Applicant: FUJITSU GENERAL LIMITED, Kanagawa (JP)

(72) Inventors: Yutaka Shimamura, Kanagawa (JP); Tomofumi Kawai, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 138 days.

(21) Appl. No.: 17/294,491

(22) PCT Filed: Dec. 23, 2019

(86) PCT No.: PCT/JP2019/050355
§ 371 (c)(1),
(2) Date: May 17, 2021

(87) PCT Pub. No.: WO2020/158250
PCT Pub. Date: Aug. 6, 2020

(65) Prior Publication Data
US 2022/0011000 A1 Jan. 13, 2022

(30) Foreign Application Priority Data
Jan. 31, 2019 (JP) .................................. 2019-016105

(51) Int. Cl.
G05B 13/02 (2006.01)
F24F 11/63 (2018.01)

(52) U.S. Cl.
CPC .......... *F24F 11/63* (2018.01); *G05B 13/0265* (2013.01)

(58) Field of Classification Search
CPC .. F24F 11/63; F24F 11/62; F24F 11/30; F24F 11/58; F24F 11/64; G05B 13/0265
(Continued)

(56) References Cited

U.S. PATENT DOCUMENTS 9,838,830 B2 12/2017 Lyons
2008/0091687 A1 4/2008 Watanabe et al.
(Continued)

FOREIGN PATENT DOCUMENTS

| CN | 101080703 | 11/2007 |
|---|---|---|
| CN | 107229965 | 10/2017 |

(Continued)

OTHER PUBLICATIONS

May 5, 2022 Chinese Office Action in Chinese Patent Application No. 201980075412.2 and English translation thereof.
(Continued)

*Primary Examiner* — Christopher E. Everett
(74) *Attorney, Agent, or Firm* — GREENBLUM & BERNSTEIN, P.L.C.

(57) ABSTRACT

A server device includes a collecting unit that stores operation history data collected from an air conditioner in a server-side storage device, a learning unit that stores a learning model generated based on the operation history data in the server-side storage device, a sending unit that sends the learning model to the air conditioner such that the air conditioner performs air conditioning inside a room by using the learning model, and an erasing unit that erases the operation history data and the learning model from the server-side storage device when an erasure instruction signal sent from the air conditioner is received.

4 Claims, 4 Drawing Sheets

(58) Field of Classification Search
USPC .......................................................... 700/276
See application file for complete search history.

(56) References Cited

U.S. PATENT DOCUMENTS

| | | | | |
|---|---|---|---|---|
| 2009/0105855 | A1* | 4/2009 | Mehta | G05B 17/02 |
| | | | | 700/89 |
| 2015/0345817 | A1* | 12/2015 | Kobori | F24F 11/64 |
| | | | | 700/276 |
| 2017/0234561 | A1* | 8/2017 | Lin | F25B 41/24 |
| | | | | 702/183 |
| 2018/0195752 | A1* | 7/2018 | Sasaki | F24F 11/80 |
| 2018/0198841 | A1 | 7/2018 | Chmielewski et al. | |
| 2018/0283723 | A1 | 10/2018 | Ock et al. | |
| 2018/0286348 | A1 | 10/2018 | Sakaguchi et al. | |
| 2019/0102695 | A1* | 4/2019 | Biswas | G06F 13/102 |
| 2020/0076960 | A1* | 3/2020 | Yoshida | H04N 1/00079 |

FOREIGN PATENT DOCUMENTS

| | | |
|---|---|---|
| CN | 108536782 | 9/2018 |
| JP | 2002-082872 | 3/2002 |
| JP | 2008-198030 | 8/2008 |
| JP | 2008-241152 | 10/2008 |
| JP | 2015-117933 | 6/2015 |
| JP | 2016-146100 | 8/2016 |

OTHER PUBLICATIONS

Jan. 2, 2023 Extended European Search Report in European Application No. 19913212.
Official Communication issued in International Bureau of WIPO Patent Application No. PCT/JP2019/050355, dated Feb. 10, 2020.

* cited by examiner

SERVER DEVICE, ADAPTER, AND AIR CONDITIONING SYSTEM

FIELD

The present invention relates to a server device, an adapter, and an air conditioning system.

BACKGROUND

There is a known air conditioning system that automatically and efficiently controls an air conditioner installed in living space (Patent Literature 1). The air conditioning system has a learning function performed by a storage unit and can reflect a suitable temperature environment in time series obtained based on preferences, action patterns, or the like of residents or the like on control performed based on the standard specification setting.

CITATION LIST

Patent Literature

Patent Literature 1: Japanese Laid-open Patent Publication No. 2015-117933

SUMMARY

Technical Problem

There is a proposed system that generates a learning model by allowing a server device to learn operation history data, such as a set temperature of the air conditioner set by a user, and that controls, by the air conditioner using the learning model sent from the server device, an operation of cooling, heating, or the like, of the air conditioner. Incidentally, this type of operation history data and learning model need to be erased from a storage device included in the air conditioner side at the time of disposal of the air conditioner in order to prevent a leakage of personal information. Furthermore, information, such as this type of operation history data and learning model, is generally erased from the storage device included in the air conditioner side in order to newly generate an appropriate learning model even when the learning model has a malfunction and the user of the air conditioner is changed.

However, in this system, both of the operation history data and the learning model are also stored in the storage device included in the server device. The user can erase the operation history data and the learning model from the storage device included in the air conditioner side; however, erasing the operation history data and the learning model from the storage device included in the server device is not easy for the user, but is complicated for the user.

Accordingly, the disclosed technology has been conceived in light of the circumstances described above and an object thereof is to provide a server device, an adapter, and an air conditioning system that easily erase information related to an air conditioner controlled by a learning model stored in a storage device in a server device from the server device.

Solution to Problem

According to an aspect of an embodiment, a server device includes a collecting unit that stores operation history data collected from an air conditioner in a server-side storage device, a learning unit that stores a learning model generated based on the operation history data in the server-side storage device, a sending unit that sends the learning model to the air conditioner such that the air conditioner performs air conditioning inside a room by using the learning model, and an erasing unit that erases the operation history data and the learning model from the server-side storage device when an erasure instruction signal sent from the air conditioner is received.

Advantageous Effects of Invention

The disclosed server device, the adapter, and the air conditioning system are used for an air conditioner whose operation is controlled by using the learning model and can easily erase information, such as the operation history data and the learning model, stored in the storage device in the server device.

DESCRIPTION OF EMBODIMENTS

Preferred embodiments of a server device, an adapter, and an air conditioning system disclosed in the present invention will be explained in detail with reference to accompanying drawings. Furthermore, each of the embodiments described below may also be appropriately modified as long as the embodiments do not conflict with each other.

Embodiment

Figure 1:
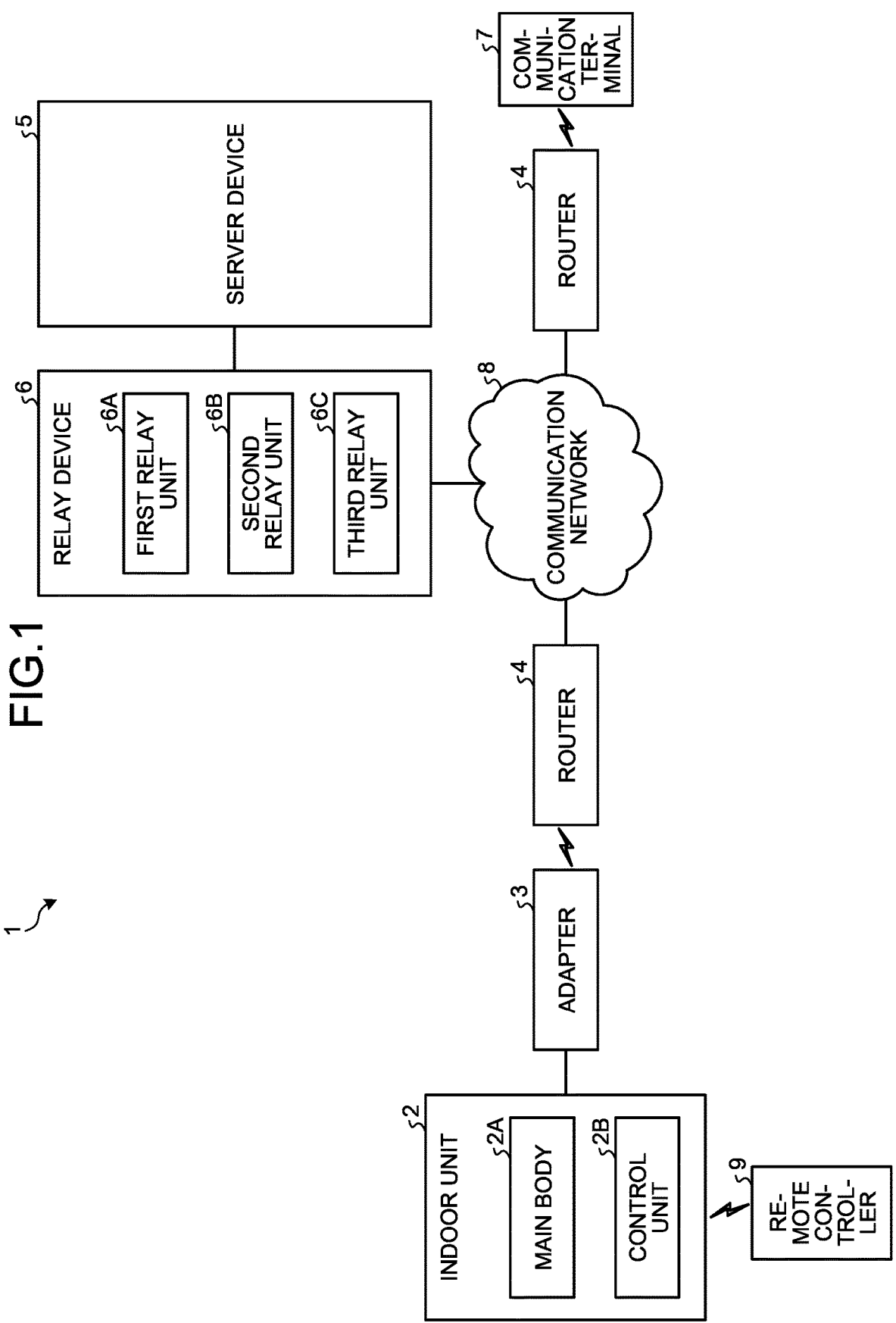
FIG. 1 is a diagram illustrating an example of an air conditioning system according to an embodiment.

FIG. 1 is a diagram illustrating an example of an air conditioning system 1 according to an embodiment. The air conditioning system 1 illustrated in FIG. 1 includes an indoor unit 2, an adapter 3, a router 4, a server device 5, a relay device 6, a communication terminal 7, and a communication network 8.

The indoor unit 2 is a part of an air conditioner that is arranged in, for example, a room and that heats or cools air in the room. Furthermore, a user of the indoor unit 2 can perform a remote operation on the indoor unit 2 by operating a remote controller 9. The indoor unit 2 includes a main body 2A and a control unit 2B that controls the main body 2A. The main body 2A has an indoor fan and an indoor heat exchanger, and the room air that has been subjected to heat exchange by the indoor heat exchanger is blown out from the main body 2A, whereby air heating, cooling, dehumidification, or the like of the room is performed. Furthermore, although not illustrated, an outdoor unit includes an outdoor fan, a compressor, and the like. The communication terminal 7 is a terminal device, such as a smartphone, held by the user.

The adapter 3 has a communication function for connecting the indoor unit 2 and the router 4 by wireless communication and a control function for performing AI control on the indoor unit 2. The adapter 3 is arranged for each of the indoor units 2. The router 4 is a device provided at an access point that connects the adapter 3 and the communication network 8 by wireless communication using, for example, a wireless local area network (WLAN) or the like. The communication network 8 is a communication network, such as the Internet. The server device 5 has a function for generating a learning model of AI that controls the indoor unit 2 and has a database or the like that stores therein operation history data or the like. Furthermore, the server device 5 is arranged in, for example, a data center. The relay device 6 has a function for connecting to the communication network 8 in communication and a function for connecting to the server device 5 in communication. The relay device 6 sends, from the adapter 3 to the server device 5, operation history data or the like that is used to generate or update the learning model applied to the indoor unit 2 through the communication network 8. Furthermore, the relay device 6 sends the learning model generated or updated by the server device 5 to the adapter 3 through the communication network 8. Furthermore, the relay device 6 is arranged in, for example, the data center or the like.

The relay device 6 includes a first relay unit 6A, a second relay unit 6B, and a third relay unit 6C. The first relay unit 6A sends, to the server device 5 through the communication network 8, the operation history data or the like that is used to generate or update the learning model received from the adapter 3 and sends the learning model generated or updated by the server device 5 to the adapter 3 through the communication network 8. The second relay unit 6B acquires an operation condition (an operation mode, such as a cooling/heating mode, a set temperature, etc.) of the indoor unit 2 that has been set by using the communication terminal 7 by the user from the outside and sends the acquired operation condition to the indoor unit 2. The third relay unit 6C acquires external data, such as a weather forecast, from, for example, the communication network 8, such as the Internet, and sends the acquired external data to the server device 5. Furthermore, the third relay unit 6C sends the external data to the adapter 3 through the communication network 8.

Figure 2:
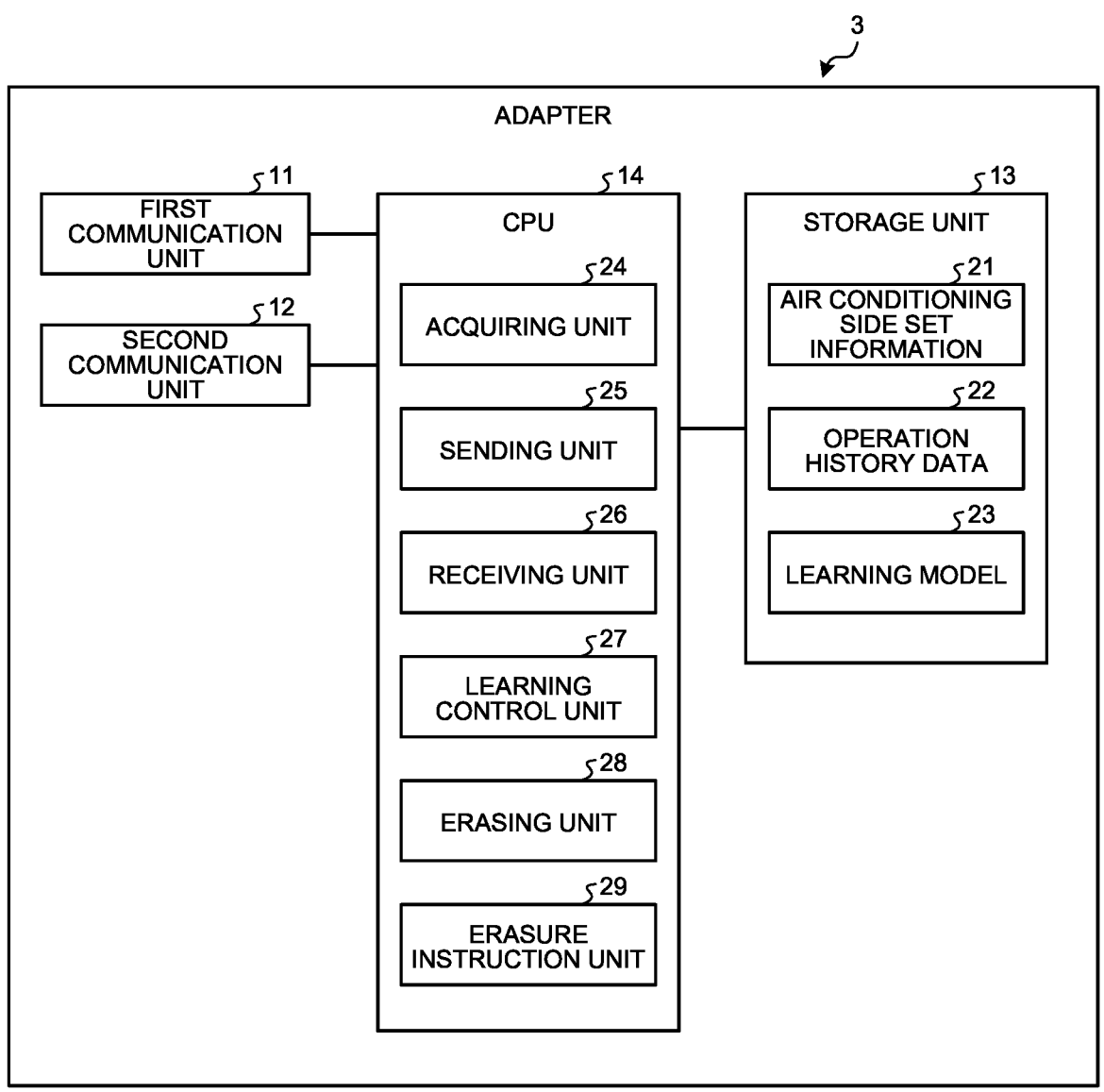
FIG. 2 is a block diagram illustrating an example of a hardware configuration of an adapter.

FIG. 2 is a block diagram illustrating an example of a configuration of the adapter 3. The adapter 3 illustrated in FIG. 2 includes a first communication unit 11, a second communication unit 12, a storage unit 13, and a central processing unit (CPU) 14. The first communication unit 11 is a communication interface (IF), such as a universal asynchronous receiver transmitter (UART), that performs a communication connection with the control unit 2B included in the indoor unit 2. The second communication unit 12 is a communication unit of, for example, a communication IF, such as a WLAN, that performs a communication connection with the router 4. The storage unit 13 includes, for example, a read only memory (ROM), a random access memory (RAM), or the like and stores various kinds of information, such as data and programs. The CPU 14 performs overall control of the adapter 3.

The storage unit 13 included in the adapter 3 illustrated in FIG. 2 stores therein air conditioning side set information 21, operation history data 22, and a learning model 23. The air conditioning side set information 21 indicates information on the router 4 connected to the adapter 3 and an access key to the server device 5. Examples of the information on the router 4 connected to the adapter 3 include a service set identifier (SSID) that identifies the router 4 and a pin code of the router 4.

The CPU 14 includes an acquiring unit 24, a sending unit 25, a receiving unit 26, a learning control unit 27, an erasing unit 28, and an erasure instruction unit 29. The acquiring unit 24 acquires the operation history data 22 from the control unit 2B in the indoor unit 2 via the first communication unit 11 and stores the acquired operation history data 22 in the storage unit 13. The sending unit 25 sends the operation history data 22 or the like acquired by the acquiring unit 24 to the server device 5 via the communication network 8. The receiving unit 26 receives the learning model 23 from the server device 5 via the communication network 8 and stores the received learning model 23 in the storage unit 13.

The learning control unit 27 controls the control unit 2B included in the indoor unit 2 based on the learning model 23 stored in the storage unit 13. Furthermore, for convenience of description, a case in which the learning control unit 27 controls the control unit 2B included in the indoor unit 2 based on the learning model 23 has been exemplified; however, the learning control unit 27 may also directly control the main body 2A in the indoor unit 2 based on the learning model 23. Furthermore, the learning control unit 27 sends a control mode based on the learning model 23 to the control unit 2B. Namely, the learning control unit 27 may also indirectly control the main body 2A via the control unit 2B, and modifications are possible as needed.

The erasing unit 28 erases the operation history data 22 and the learning model 23 from the storage unit 13 when "erasure of AI control related information" is selected by an operation performed by the adapter 3 based on the signal received from the control unit 2B included in the indoor unit 2 or received from the server device 5. The erasing unit 28 erases the air conditioning side set information 21, the operation history data 22, and the learning model 23 from the storage unit 13 when "erase all" is selected by an operation performed by the adapter 3. The erasure instruction unit 29 sends an erasure instruction signal indicating "erasure of AI control related information" to the server device 5 through the communication network 8 when "erasure of AI control related information" is selected by an operation performed by the adapter 3. The erasure instruction unit 29 sends an erasure instruction signal indicating "erase all" to the server device 5 through the communication network 8 when "erase all" is selected by an operation performed by the adapter 3.

Figure 3:
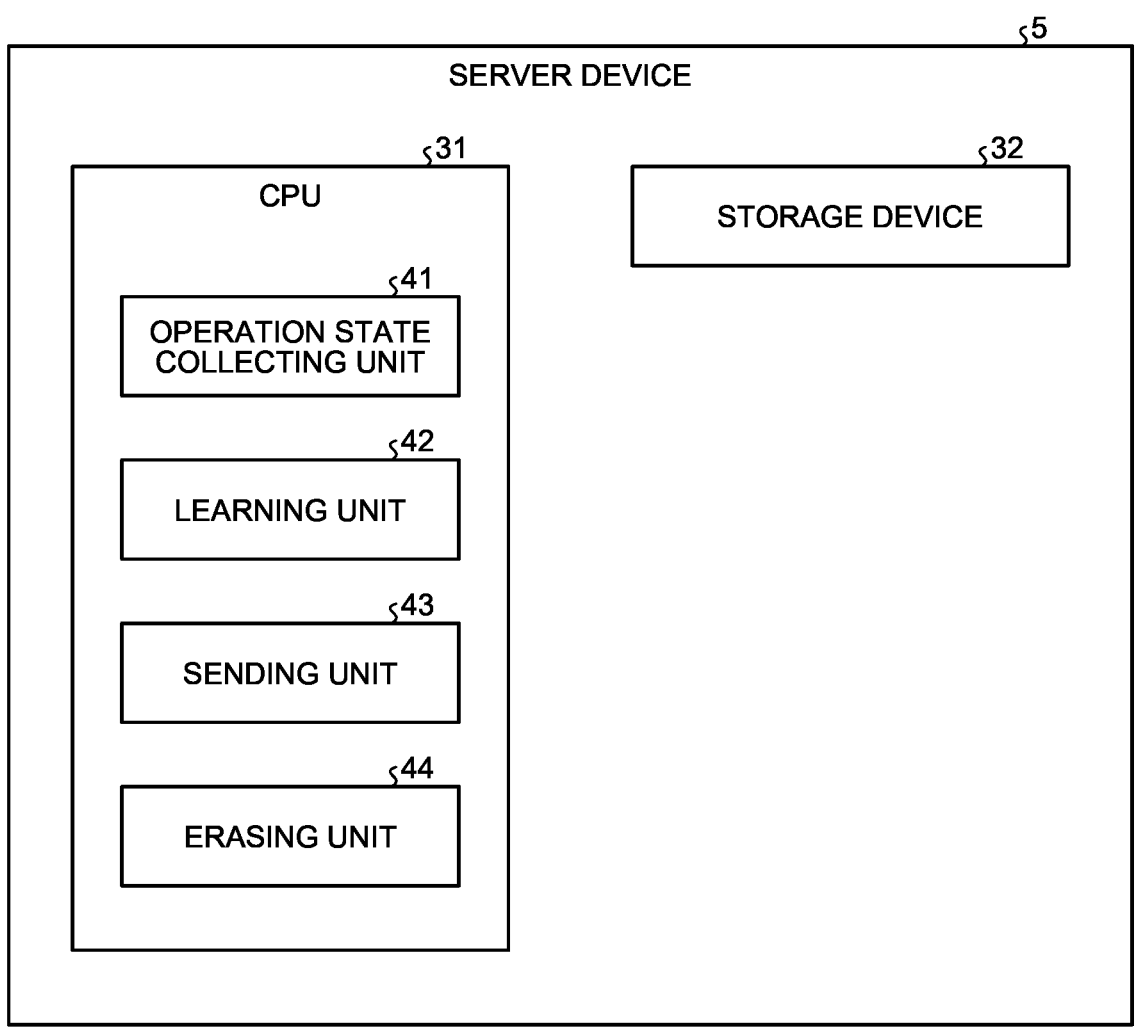
FIG. 3 is a block diagram illustrating a server device.

FIG. 3 is a block diagram illustrating an example of a functional configuration of the server device 5. The server device 5 includes a CPU 31 and a storage device 32. The storage device 32 includes, for example, a ROM, a RAM, or the like and stores various kinds of information, such as data and programs. The storage device 32 stores therein operation history data 22, the learning model 23, and user registration information. The user registration information indicates a media access control (MAC) address of the adapter 3, an email address registered by the user, a zip code registered by the user, and a group ID. The group ID is an ID that is used every time a learning timing or the time of collecting logs is determined.

The CPU 31 includes an operation state collecting unit 41, a learning unit 42, a sending unit 43, and an erasing unit 44. The operation state collecting unit 41 connects to each of the adapters 3 associated with the respective indoor units 2 and receives the operation history data 22 from the adapter 3 through the router 4, the communication network 8, and the relay device 6 by. The learning unit 42 performs learning by using the operation history data 22 received by the operation state collecting unit 41, and then, generates or updates the learning model 23 of each of the indoor units 2 based on the learning results. The learning unit 42 stores the generated or updated learning model 23 in the storage device 32. The sending unit 43 sends the learning model 23 generated or updated by the learning unit 42 to the adapter 3 through the relay device 6, the communication network 8, and the router 4.

The erasing unit 44 erases the operation history data 22 and the learning model 23 from the storage device 32 when the erasing unit 44 receives the erasure instruction signal sent from the adapter 3 and when the received erasure instruction signal indicates "erasure of AI control related information". The erasing unit 44 erases the operation history data 22, the learning model 23, and the user registration information from the storage device 32 when the erasing unit 44 receives the erasure instruction signal sent from the adapter 3 and when the received erasure instruction signal indicates "erase all". The erasing unit 44 further erases the operation history data 22, the learning model 23, and the user registration information from the storage device 32 when a predetermined period of time has elapsed from the timing in which the adapter 3 accesses the server device 5 last time. The predetermined period of time may also be a period of time for which the air conditioning system 1 is not used and, here, a two years period of time is exemplified.

An operation of the air conditioning system 1 will be described. The air conditioning system 1 performs an operation related to AI control of the air conditioner and an operation related to erasure of information.

In the operation related to AI control of the air conditioner, the adapter 3 acquires the operation history data 22 from the indoor unit 2 at an acquisition timing at an interval of 5 minutes and stores the acquired operation history data 22 in the storage unit 13. The adapter 3 sends, to the server device 5 every 48 hours, the operation history data 22 by an amount corresponding to 48 hours from among the plurality of pieces of the operation history data 22 stored in the storage unit 13. The server device 5 receives the operation history data 22 sent from the adapter 3 and stores the operation history data 22 in the storage device 32. The server device 5 generates the learning model 23 based on the operation history data 22 stored in the storage device 32 and stores the generated learning model 23 in the storage device 32. The server device 5 sends the learning model 23 stored in the storage device 32 to the adapter 3 via the relay device 6. When the adapter 3 receives the learning model 23 sent from the server device 5, the adapter 3 stores the received learning model 23 in the storage unit 13. The adapter 3 controls the control unit 2B included in the indoor unit 2 based on the learning model 23 stored in the storage unit 13 and indirectly controls the main body 2A in the indoor unit 2 via the control unit 2B.

The learning model 23 has a sensible temperature setting prediction model that predicts a sensible temperature of the user in a room to be felt, for example, 5 minutes later in accordance with the operation state of the air conditioner in each home and that controls the air conditioner in accordance with the predicted sensible temperature. Conventionally, because the air conditioner adjusts a temperature such that an indoor temperature is set to be the target temperature, a user sometimes feels uncomfortable about changes in temperature due to the adjustment. In contrast, the sensible temperature setting prediction model is a program executed when the air conditioner is adjusted such that the user feels comfortable in accordance with the operation history data 22 in time series related to, for example, an indoor temperature, indoor humidity, an outdoor temperature, or the like. For example, because the air conditioner is controlled based on the sensible temperature setting prediction model, the set temperature of the air conditioner is changed to the temperature, which is different from the temperature set by the user, such that the user feels comfortable. According to this operation, because the air conditioner is controlled based on the learning model 23, the air conditioning system 1 can appropriately operate the air conditioner such that the user of the air conditioner feels comfortable.

Figure 4:
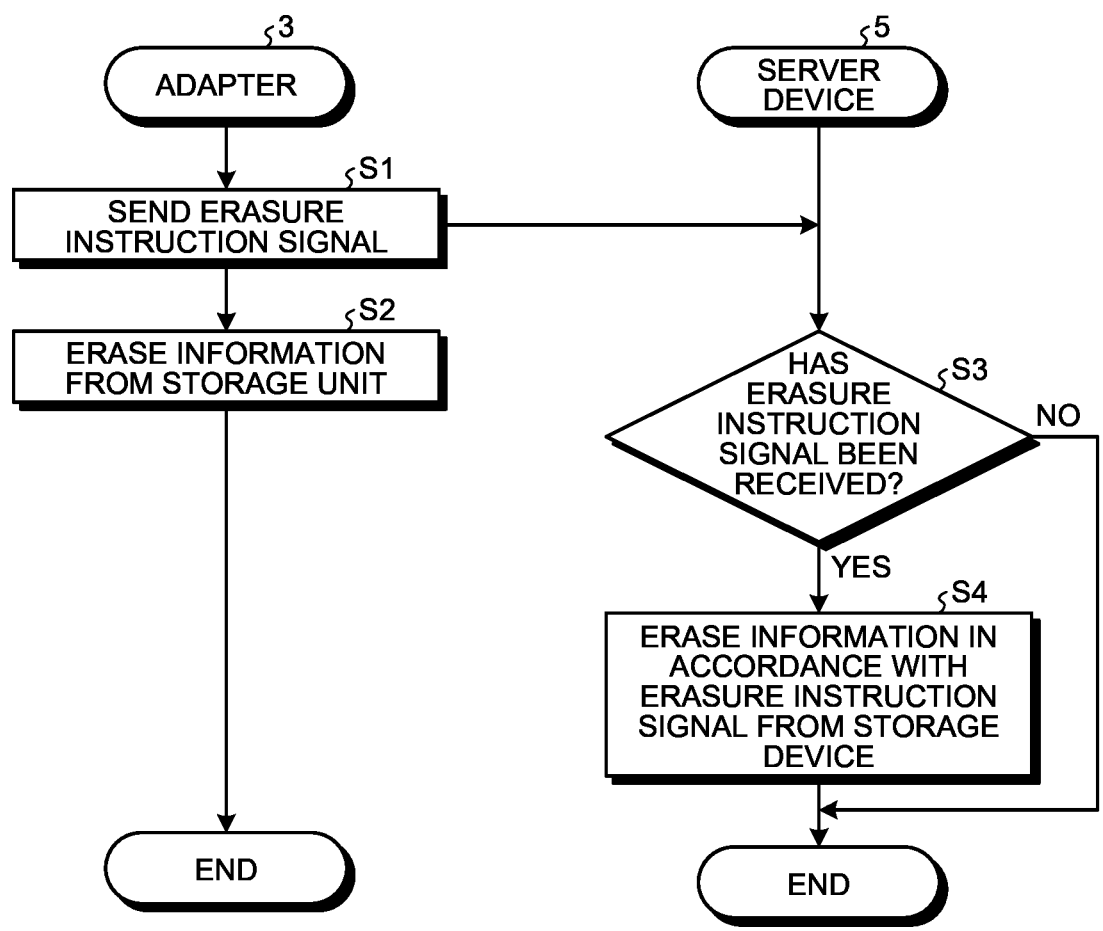
FIG. 4 is a flowchart illustrating an example of an operation of an air conditioning system 1 related to erasure of information.

FIG. 4 is a flowchart illustrating an example of an operation of the air conditioning system 1 related to erasure of information. When the user desires to erase the operation history data 22 and the learning model 23 from the storage unit 13 in the adapter 3, the user selects "erasure of AI control related information" by operating the adapter 3. When the user desires to erase the air conditioning side set information 21, the operation history data 22, and the learning model 23 from the storage unit 13 in the adapter 3, the user selects "erase all" by operating the adapter 3. When "erasure of AI control related information" is selected, the adapter 3 sends the erasure instruction signal indicating "erasure of AI control related information" to the server device 5 and, when "erase all" is selected, the adapter 3 sends the erasure instruction signal indicating "erase all" to the server device 5 (Step S1). adapter 3 further erases information from the storage unit 13 in accordance with an operation performed with respect to the adapter 3 (Step S2). Namely, when "erasure of AI control related information" is selected, the adapter 3 erases the operation history data 22 and the learning model 23 from the storage unit 13 and, when "erase all" is selected, the adapter 3 erases the air conditioning side set information 21, the operation history data 22, and the learning model 23 from the storage unit 13.

When the server device 5 receives the erasure instruction signal sent from the adapter 3 (Yes at Step S3), the server device 5 erases the information associated with the erasure instruction signal from the storage device 32 (Step S4). Namely, when the erasure instruction signal indicates "erasure of AI control related information", the server device 5 erases the operation history data 22 and the learning model 23 from the storage device 32. When the erasure instruction signal indicates "erase all", the server device 5 erases the operation history data 22, the learning model 23, and the user registration information from the storage device 32.

The server device 5 further indirectly judges whether a predetermined period of time (here, two years is assumed as a period of time in which the air conditioning system 1 is considered not to be used) has elapsed from the timing at which the adapter 3 accesses the server device 5 last time. When the server device 5 judges that two years have elapsed from the last access, the server device 5 erases the operation history data 22, the learning model 23, and the user registration information from the storage device 32.

Effects of the Server Device 5 According to the Embodiment

The server device 5 according to the embodiment includes the operation state collecting unit 41, the learning unit 42, the sending unit 43, and the erasing unit 44. The operation state collecting unit 41 stores the operation history data 22 collected from the adapter 3 in the storage device 32. The learning unit 42 stores the learning model 23 generated based on the operation history data 22 in the storage device 32. The sending unit 43 sends the learning model 23 to the adapter 3 such that the adapter 3 performs air conditioning inside the room by using the learning model 23. The erasing unit 44 erases the operation history data 22 and the learning model 23 from the storage device 32 when the erasure instruction signal sent from the adapter 3 is received and the erasure instruction signal indicates "erasure of AI control related information".

Personal information on the user of the air conditioner is sometimes included in the operation history data 22 and the learning model 23. If the personal information is still being stored in the storage device 32 in the server device 5, a security update is not performed after, for example, the end of services related to AI control of the air conditioner, information leakage or the like of the personal information is concerned. When the operation history data 22 and the learning model 23 are erased from the storage unit 13 included in the adapter 3, the server device 5 automatically erases the operation history data 22 and the learning model 23 from the storage device 32 in response to the erasure instruction signal that is automatically sent from the adapter 3. At this time, the user does not need to perform a process for erasing the personal information from the storage device 32 included in the server device 5 and can easily erase the personal information from the storage device 32 included in the server device 5.

Furthermore, the storage device 32 in the server device 5 according to the embodiment further stores therein user registration information that is different from the operation history data 22 and the learning model 23. The erasing unit 44 erases the operation history data 22, the learning model 23, and the user registration information from the storage device 32 when the erasure instruction signal sent from the adapter 3 is received and the erasure instruction signal indicates "erase all". At this time, the server device 5 can automatically erase the operation history data 22, the learning model 23, and the user registration information from the storage device 32 in response to the erasure instruction signal that is automatically sent from the adapter 3. At this time, the user does not need to perform a process for erasing the operation history data 22, the learning model 23, and the user registration information from the storage device 32 included in the server device 5 and can easily erase these pieces of information from the storage device 32 included in the server device 5.

Furthermore, the erasing unit 44 in the server device 5 according to the embodiment erases the operation history data 22, the learning model 23, and the air conditioning side set information 21 from the storage device 32 when the information (the operation history data 22 and the learning model 23) is not sent from the adapter 3 within a predetermined period of time. At this time, the server device 5 can automatically erase the information related to the air conditioner that is not used in the predetermined period of time and can prevent an information leakage of the personal information.

The adapter 3 according to the embodiment includes the acquiring unit 24, the sending unit 25, the receiving unit 26, the learning control unit 27, the erasing unit 28, and the erasure instruction unit 29. The acquiring unit 24 stores the operation history data 22 acquired from the indoor unit 2 in the storage unit 13. The sending unit 25 sends the operation history data 22 to the server device 5. The receiving unit 26 receives the learning model 23 sent from the server device 5 and stores the learning model 23 in the storage unit 13. The learning control unit 27 controls the adapter 3 such that the interior of the room is subjected to air conditioned based on the learning model 23. The erasing unit 28 erases the operation history data 22 and the learning model 23 from the storage unit 13 when "erasure of AI control related information" is selected by an operation performed by the adapter 3. The erasure instruction unit 29 sends the erasure instruction signal indicating "erasure of AI control related information" to the server device 5 when "erasure of AI control related information" is selected by an operation performed by the adapter 3. At this time, the adapter 3 can automatically send the erasure instruction signal indicating "erasure of AI control related information" to the server device 5 and can easily erase the operation history data 22 and the learning model 23 from the storage device 32 included in the server device 5.

Furthermore, the storage unit 13 in the adapter 3 according to the embodiment further stores therein user registration information that is different from the operation history data 22 and the learning model 23. The erasing unit 28 erases the operation history data 22, the learning model 23, and the user registration information from the storage unit 13 when "erase all" is selected by an operation performed by the adapter 3. The erasure instruction unit 29 sends the erasure instruction signal indicating "erase all" to the server device 5 when "erase all" is selected by an operation performed by the adapter 3. At this time, the adapter 3 can automatically send the erasure instruction signal indicating "erase all" to the server device 5 and can easily erase the operation history data 22, the learning model 23, and the user registration information from the storage device 32 included in the server device 5.

Furthermore, all or any part of various processing functions performed by each unit may also be executed by a CPU (or a microcomputer, such as a micro processing unit (MPU), a micro controller unit (MCU), or the like). Furthermore, all or any part of various processing functions may also be, of course, executed by programs analyzed and executed by the CPU (or the microcomputer, such as the MPU or the MCU), or executed by hardware by wired logic.

REFERENCE SIGNS LIST

1: air conditioning system
2: indoor unit
2B: control unit
3: adapter
5: server device
13: storage unit
21: air conditioning side set information
22: operation history data
23: learning model
24: acquiring unit
25: sending unit
26: receiving unit
27: learning control unit
28: erasing unit
29: erasure instruction unit
32: storage device
41: operation state collecting unit
42: learning unit
43: sending unit
44: erasing unit

The invention claimed is:
1. An air conditioning system comprising:
a server device; and
an adapter configured to
  store operation history data acquired from an air conditioner in an adapter-side storage device;
  send the operation history data to the server device;
  receive a learning model sent from the server device;
  store the learning model in the adapter-side storage device;

control the air conditioner such that inside a room is subjected to air conditioning based on the learning model;

erase the operation history data and the learning model from the adapter-side storage device when a predetermined operation is performed by the adapter; and send an erasure instruction signal to the server device when the predetermined operation is performed, wherein the server device is configured to:

store the operation history data in a server-side storage device;

generate the learning model based on the operation history data;

store the learning model in the server-side storage device;

send the learning model to the adapter; and erase the operation history data and the learning model from the server-side storage device when the erasure instruction signal is received.

2. The air conditioning system according to claim 1, wherein the adapter-side storage device further stores therein information that is different from the operation history data and the learning model, the server-side storage device further stores the information, the adapter is further configured to erase the operation history data, the learning model, and the information from the adapter-side storage device when another operation is performed to the adapter, send another erasure instruction signal to the server device when the another operation is performed to the adapter and the server device is further configured to erase the operation history data, the learning model, and the information from the server-side storage device when the another erasure instruction signal is received.

3. The air conditioning system according to claim 2, wherein the server device is further configured to erase the operation history data, the learning model, and the information from the server-side storage device when the server device does not receive other operation history data sent from the adapter in a predetermined period after the server device receives the operation history data.

4. The air conditioning system according to claim 1, wherein the predetermined operation comprises a first erasure instruction selected by a user operating the adapter.

* * * * *